United States Patent
Esnard-Domerego et al.

(10) Patent No.: US 8,729,867 B2
(45) Date of Patent: May 20, 2014

(54) SINK CURRENT ADAPTATION BASED ON POWER SUPPLY DETECTION

(75) Inventors: Domitille Esnard-Domerego, Biot (FR); John Walley, Ladera Ranch, CA (US); Long Wang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 726 days.

(21) Appl. No.: 12/938,956

(22) Filed: Nov. 3, 2010

(65) Prior Publication Data

US 2012/0104994 A1    May 3, 2012

(51) Int. Cl.
*H02J 7/04*    (2006.01)
*H02J 7/16*    (2006.01)

(52) U.S. Cl.
USPC .......................................... 320/162; 320/114

(58) Field of Classification Search
USPC .................. 320/106, 111–112, 114, 138, 162
See application file for complete search history.

(56) References Cited

U.S. PATENT DOCUMENTS

| | | | |
|---|---|---|---|
| 2003/0052547 A1* | 3/2003 | Fischer et al. | 307/154 |
| 2008/0272741 A1* | 11/2008 | Kanamori | 320/137 |
| 2009/0184688 A1* | 7/2009 | Kim et al. | 320/162 |
| 2010/0201308 A1* | 8/2010 | Lindholm | 320/107 |
| 2010/0293302 A1* | 11/2010 | Fujii et al. | 710/16 |
| 2011/0279093 A1* | 11/2011 | Lin et al. | 320/162 |

OTHER PUBLICATIONS

Remple, et al., "Battery Charging Specification", USB Implementers Forum, Inc., Revision 1.1, (Apr. 15, 2009), 43 pages.

* cited by examiner

*Primary Examiner* — Samuel Berhanu
(74) *Attorney, Agent, or Firm* — Fiala & Weaver P.L.L.C.

(57) ABSTRACT

Techniques are provided for selecting a charge current to be sunk by a mobile electronic device. A charging device is received at a connector of the mobile electronic device. The charging device is configured to supply a charge current to a rechargeable battery of the mobile electronic device. One or more data signals is/are received from the charging device at an interface circuit of the mobile electronic device on one or more data signal lines through the connector. One or more control signals are applied to the interface circuit to enable data signal values to be generated for the data signal(s) based on the control signal(s) and a type of the charging device. The data signal values are mapped to a maximum charge current for the rechargeable battery. The charge current supplied by the charging device to the rechargeable battery is limited to the selected maximum charge current.

24 Claims, 7 Drawing Sheets

700

| | values for first and second data signal lines 220 and 222 | | | | |
|---|---|---|---|---|---|
| | for D+ line pulled down, D- line pulled down | for D+ line pulled down, D- line pulled up | for D+ line pulled up, D- line pulled down | for D+ line pulled up, D- line pulled up | Hex Signature |
| first charger type | 1, 0 | 1, 1 | 1, 0 | 1, 1 | BB |
| second charger type | 1, 1 | 1, 1 | 1, 1 | 1, 1 | FF |
| third charger type | 0, 0 | 0, 0 | 0, 0 | 0, 0 | 00 |
| fourth charger type | 0, 0 | 0, 1 | 1, 0 | 1, 1 | 1B |
| fifth charger type | 0, 0 | 0, 0 | 0, 0 | 1, 1 | 03 |

SINK CURRENT ADAPTATION BASED ON POWER SUPPLY DETECTION

BACKGROUND OF THE INVENTION

1. Field of the Invention

The present invention relates to mobile electronic devices that use rechargeable batteries.

2. Background Art

A battery is a device that provides electrical energy used to power an electrical device. A battery typically includes one or more electrochemical cells that store chemical energy, which is converted to electrical energy output by the battery to provide power. Batteries are used in a multitude of electrical devices, such as electrical devices that are mobile and/or unable to be constantly connected to another power source such as an AC (alternating current) power source. Batteries may also be used in electrical devices as a backup power source, to provide power when a primary power source is lost.

A rechargeable battery is a type of battery that is becoming increasingly popular. Charge in a rechargeable battery can be restored by the application of electrical energy. Examples of rechargeable batteries include nickel cadmium (NiCd), nickel metal hydride (NiMH), lithium ion (Li-ion), and lithium ion polymer (Li-ion) batteries.

A handheld device can be connected to various kinds of power supplies so that a rechargeable battery of the handheld device is charged. For example, a handheld device may be connected to a battery charger that accompanied the handheld device, an unbranded or off-the-shelf charger, a USB (universal serial bus) host (e.g., a personal computer), and further types of charging devices. However, different types of charging devices have different charge current capabilities. If a handheld device is configured to sink a higher charge current from a charging device than the charging device is capable of supplying, the handheld device may not be charged properly.

BRIEF SUMMARY OF THE INVENTION

Methods, systems, and apparatuses are described for selecting a charge current to be supplied by a charging device and sunk by a mobile electronic device substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
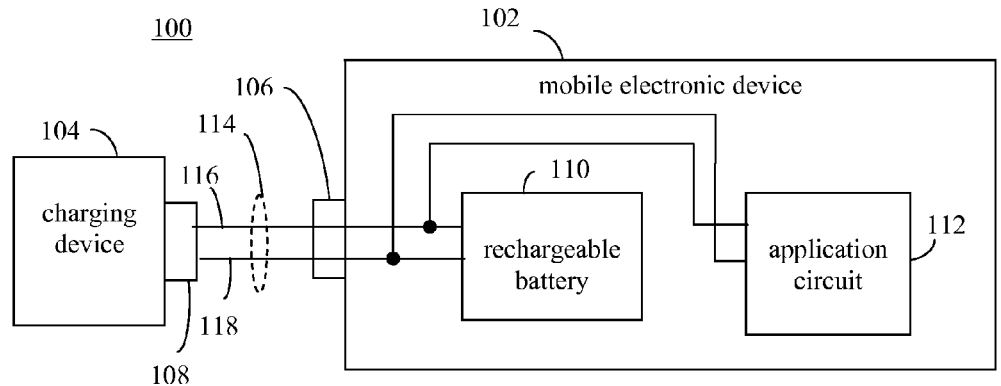
FIGS. 1 and 2 show block diagrams of example charging systems.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Charging System Embodiments

Embodiments of the present invention relate to rechargeable batteries. A battery is a device that provides electrical energy used to power an electrical device. A battery typically includes one or more electrochemical cells that store chemical energy, which is converted to electrical energy that is output by the battery to provide power. Charge in a rechargeable battery can be restored by the application of electrical energy.

A variety of types of devices, such as mobile devices, may include one or more rechargeable batteries. Such a device may be connected with a charging device to recharge the rechargeable batteries of the device. For example, FIG. 1 shows a block diagram of a charging system 100. As shown in FIG. 1, charging system 100 includes a mobile electronic device 102, a charging device 104, and an optional cable 114. As shown in FIG. 1, mobile electronic device 102 includes a connector, 106, a rechargeable battery 110, and an application circuit 112, and charging device 104 includes a connector 108.

Mobile electronic device 102 is an electronic device that is mobile, such as a headset (e.g., a Bluetooth™ headset), a handheld smart phone, a laptop computer, etc. Application circuit 112 may include one or more electrical components, including processors (e.g., microprocessors), microphones, speakers, displays, etc., that provide the functionality of mobile electrical device 102.

Rechargeable battery 110 is a rechargeable battery that includes a material that stores charge and may be recharged after losing some charge. Rechargeable battery 110 may be any type of rechargeable battery, including a lithium-based rechargeable battery, such as a lithium ion (Li-ion) or lithium ion polymer (Li-ion polymer) battery, or a nickel-based rechargeable battery, such as a nickel cadmium (NiCd) or nickel metal hydride (NiMH) battery. During operation of mobile electronic device 102, rechargeable battery 110 powers application circuit 112. As shown in FIG. 1, rechargeable battery 110 has a first terminal (e.g., negative or positive polarity) and a second terminal 104 (with polarity opposite that of first terminal 102) that are coupled to application circuit 112 to provide power to application circuit 112.

Charging device 104 may be coupled to mobile electronic device 102 so that rechargeable battery 110 may be charged. For example, in FIG. 1, cable 114 may be used to connect charging device 104 to mobile electronic device 102. A first connector end of cable 114 may mate with connector 108 of charging device 104, and a second connector end of cable 114 may mate with connector 106 of mobile electronic device 102. Charge may be supplied from charging device 104 over cable 114 to mobile electronic device 102. Alternatively, connector 108 of charging device 104 may mate directly with connector 106 of mobile electronic device 102 so that charging device 104 can supply charge to mobile electronic device 102 without cable 114. For example, as shown in FIG. 1, cable 114 may include a power signal line 116 that carries a power signal, and a ground signal line 118 that carries a ground signal. The power and ground lines are connected between corresponding pins of connectors 106 and 108. Power and ground signal lines 116 and 118 are coupled (directly or indirectly, such as through a safety circuit, etc.) to the first and second terminals of rechargeable battery 110, respectively, to enable rechargeable battery 110 to be charged by charging device 104.

In some cases, connectors 106 and 108 may have additional pins, and may be proprietary or industry standard connectors. For example, connectors 106 and 108 may each include four pins. For instance, in an embodiment, connectors 106 and 108 may be USB connectors that have four pins, including a power signal pin, a ground signal pin, a first data signal pin (e.g., a D+ pin), and a second data signal pin (e.g., a D− pin). A USB connector is a common connector type that is used to charge or power handheld devices. A charging device having a USB connector may supply charge to another device that also has a USB connector using the power signal pins and ground signal pins. In some cases, a device may use a USB connector without having a real USB interface (e.g., the device is not able to communicate to a USB host, the D+ and D− pins are unused). Such devices may have the USB connector merely to enable them to supply charge or to receive charge using the power and ground signal pins. USB connectors that are used for charging are becoming widespread. Examples of such devices include China YD/T-1591 specification devices, USB BC and ITU designated micro USB interface standard charger interfaces. However, such charging devices do not have the same power capabilities. A charge-receiving device cannot sink the same amount of charge from a USB low power device than from a wall charger.

Figure 2:
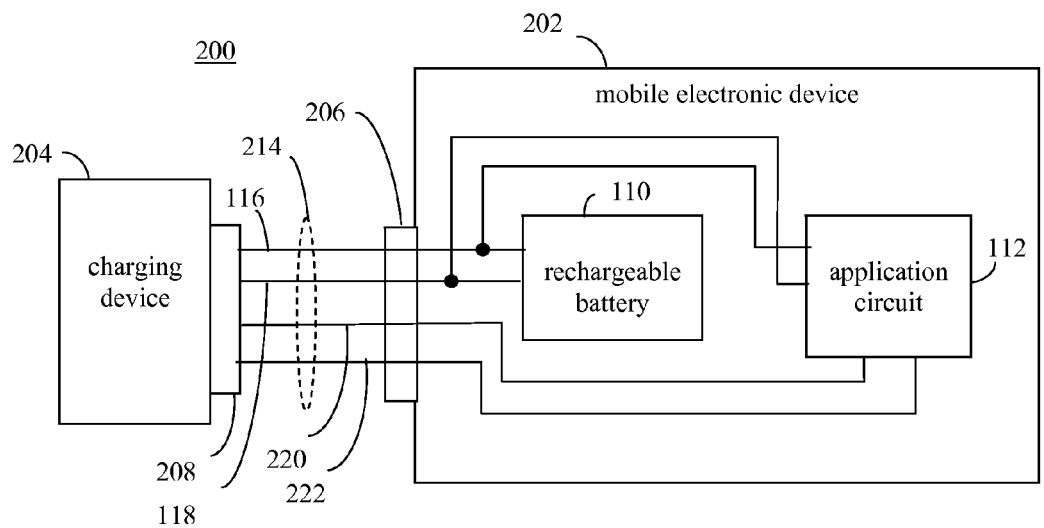

For instance, FIG. 2 shows a block diagram of a charging system 200. Charging system 200 is similar to charging system 100 of FIG. 1, with similarly named elements being generally similar, and with differences described as follows. As shown in FIG. 2, charging system 200 includes a mobile electronic device 202, a charging device 204, and an optional cable 214. Mobile electronic device 202 includes a connector, 206, rechargeable battery 110, and application circuit 112, and charging device 204 includes a connector 208. In the example of FIG. 2, connectors 206 and 208 are USB connectors, having four pins each, including a power signal pin, a ground signal pin, a first data signal pin (e.g., a D+ pin), and a second data signal pin (e.g., a D− pin).

As shown in FIG. 2, cable 214, which mates with connectors 206 and 208, includes power signal line 116, ground signal line 118, a first data signal line 220 (also known as a D+ line of a USB connector), and a second data signal line 222 (also known as a D− line of the USB connector), corresponding to the four pins of connectors 206 and 208. First and second data signals lines 220 and 222 may or may not be coupled to circuits, connectors, and/or other components of charging device 204. Furthermore, as shown in FIG. 2, first and second data signal lines 220 and 222 are coupled with application circuit 112. Application circuit 112 may receive and/or transmit data signals over first and second data signal lines 220 and 222, to exchange data with charging device 204 and/or other devices coupled to connector 206 of mobile electronic device 102.

Charging device 204 may be any type of charging device capable of supplying a charge current when connected to a mobile electronic device. For instance, charging device 204 may be a dedicated charger, an unbranded charger, a charger having a PS2 adaptor, a USB host, a device having a UoU (USB over UART (universal asynchronous receiver/transmitter)) interface, or other charging device. Different types of charging devices have different charge current supplying capabilities. If mobile electronic device 202 is configured to sink a higher charge current from charging device 204 than charging device 204 is capable of supplying, mobile electronic device 202 may not be charged properly. For example, mobile electronic device 202 may sink a greater current load than charging device 204 can provide, which may damage charging device 204 and/or mobile electronic device 202, may cause the charging voltage to drop to an ineffective level, may cause charge current oscillations, and/or may lead to other problems. As such, it would be advantageous for mobile electronic device 202 to be capable of adapting to different charging devices.

Embodiments are described herein for mobile electronic devices that are capable of adapting to different charging devices. In embodiments, a mobile electronic device is configured to detect a type of charging device coupled to the mobile electronic device in a non-intrusive manner. As a result of the detection, the mobile electronic device adjusts the charge current that the mobile electronic device sinks from the charging device to a level that the detected charging device is capable of supplying. As such, the mobile electronic device can be properly charged by the mobile electronic device.

Figure 3:
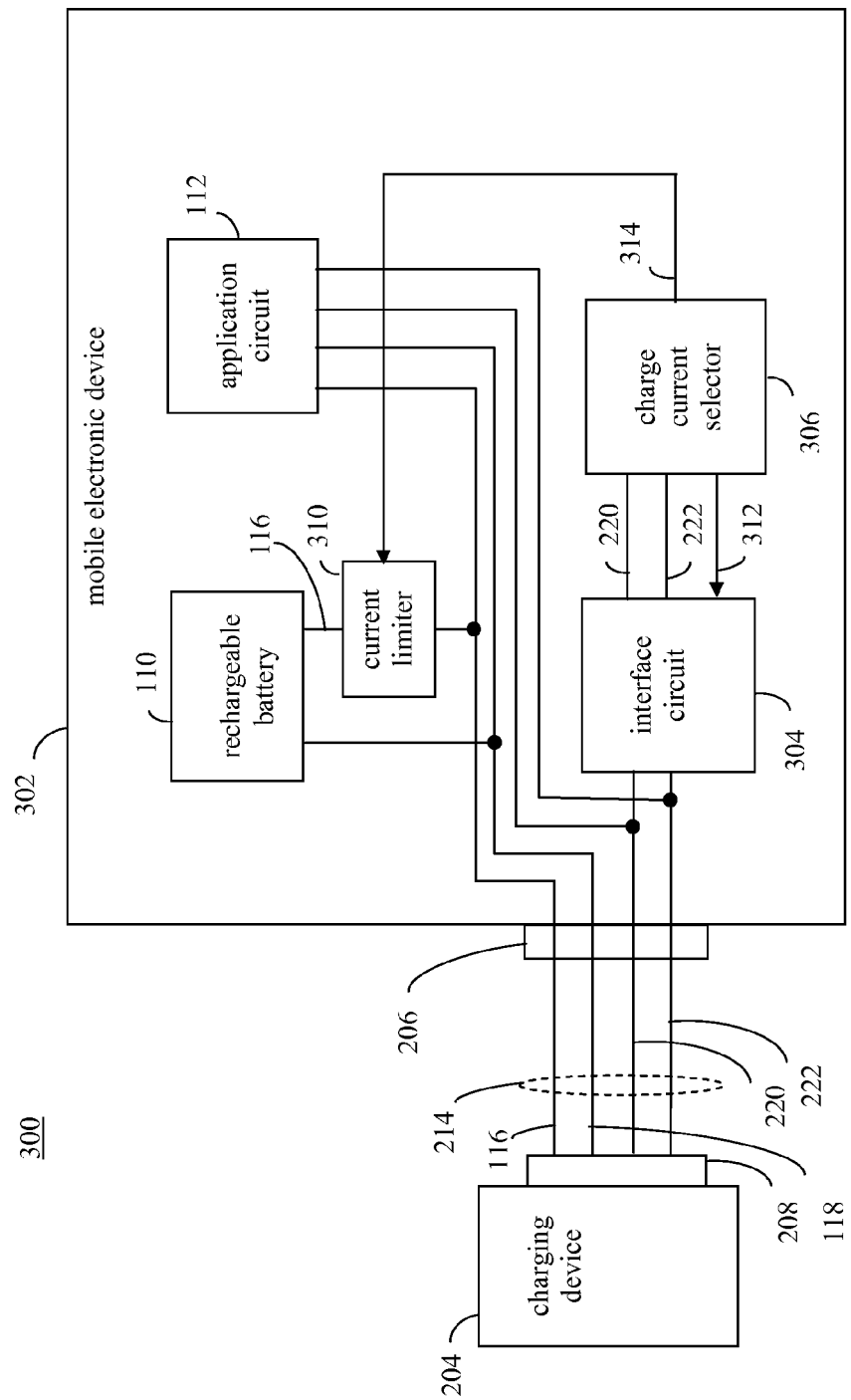
FIG. 3 shows a block diagram of a charging system, according to an example embodiment.

For instance, FIG. 3 shows a block diagram of a charging system 300, according to an example embodiment. As shown in FIG. 3, charging system 300 includes a mobile electronic device 302, charging device 204, and optional cable 214. Mobile electronic device 302 is capable of determining a type of charging device 204 connected thereto, and of selecting a charge current to sink from charging device 204 based on the determination. As shown in FIG. 3, mobile electronic device 302 includes connector, 206, rechargeable battery 110, application circuit 112, an interface circuit 304, a charge current selector 306, and a current limiter 310. Charging device 204 includes connector 208.

Mobile electronic device 302 may be any type of electronic device that is mobile, including a wireless headset, a mobile computing device (e.g., a personal digital assistant (PDA), a laptop computer, a notebook computer, a tablet computer (e.g., an Apple iPad™), a netbook, etc.), a mobile phone (e.g., a cell phone, a smart phone, etc.), a mobile email device, a music player (e.g., an MP3 player, an Apple iPod®, etc.), a wireless mouse, etc. Application circuit 112 may include one or more electrical components, including processors (e.g., microprocessors), microphones, speakers, displays, etc., that provide the functionality of mobile electrical device 302.

In the example of FIG. 3, connectors 206 and 208 have four pins each. For instance, in an embodiment, connectors 206 and 208 may be USB connectors. As shown in FIG. 3, cable 214, which mates with connectors 206 and 208, includes power signal line 116, ground signal line 118, first data signal line 220, and second data signal line 222, corresponding to the four pins of connectors 206 and 208. As shown in FIG. 3, first and second data signal lines 220 and 222 are coupled with application circuit 112 and interface circuit 304, and are received by charge current selector 306. Power and ground signal lines 116 and 118 are coupled with rechargeable battery 110 and application circuit 112. Although not shown in FIG. 3, power and ground signal lines 116 and 118 may additionally be coupled with interface circuit 304 and charge current selector 306. Application circuit 112 may receive and/or transmit data over first and second data signal lines 220 and 222 to exchange data with charging device 204 and/or other devices coupled to connector 206 of mobile electronic device 302.

As shown in FIG. 3, interface circuit 304 is coupled to first and second data signal lines 220 and 222 received from charging device 204. Although two data signals are shown in the example USB embodiment of FIG. 3, in other embodiments, further numbers of data signals may be present. Charge current selector 306 is configured to generate one or more control signals that are applied to interface circuit 304. For instance, as shown in FIG. 3, charge current selector 306 generates one or more controls signal(s) 312 applied to interface circuit 304. Interface circuit 304 is configured to couple pull up and pull down circuits to first and second data signal lines 220 and 222 according to a control sequence provided by control signal(s) 312. As a result, first and second data signal lines 220 and 222 have data signal values based on the pull up/pull down configuration, and based on the charging device type of charging device 204. Charge current selector 306 reads the data signal values of first and second data signal lines 220 and 222 in the sequence of pulled up and/or pulled down states, and maps the data signal values to a selected charging device type for charging device 204. A maximum charge current to be sunk by rechargeable battery 110 corresponding to the selected charging device type is selected. Charge current selector 306 generates a charge current selection signal 314 that corresponds to the selected maximum charge current.

Current limiter 310 receives charge current selection signal 314. As shown in FIG. 3, current limiter 310 is coupled in power signal line 116 between charging device 204 and rechargeable battery 110. Current limiter 310 limits the charge current provided over power signal line 116 to rechargeable battery 110 to the maximum charge current according to charge current selection signal 314. Current limiter 310 may be implemented in any manner to limit a charge current according to a current selection signal, such as including one or more resistors and/or other electrical circuits/components, and/or in any other suitable manner, as would be known to persons skilled in the relevant art(s).

Figure 4:
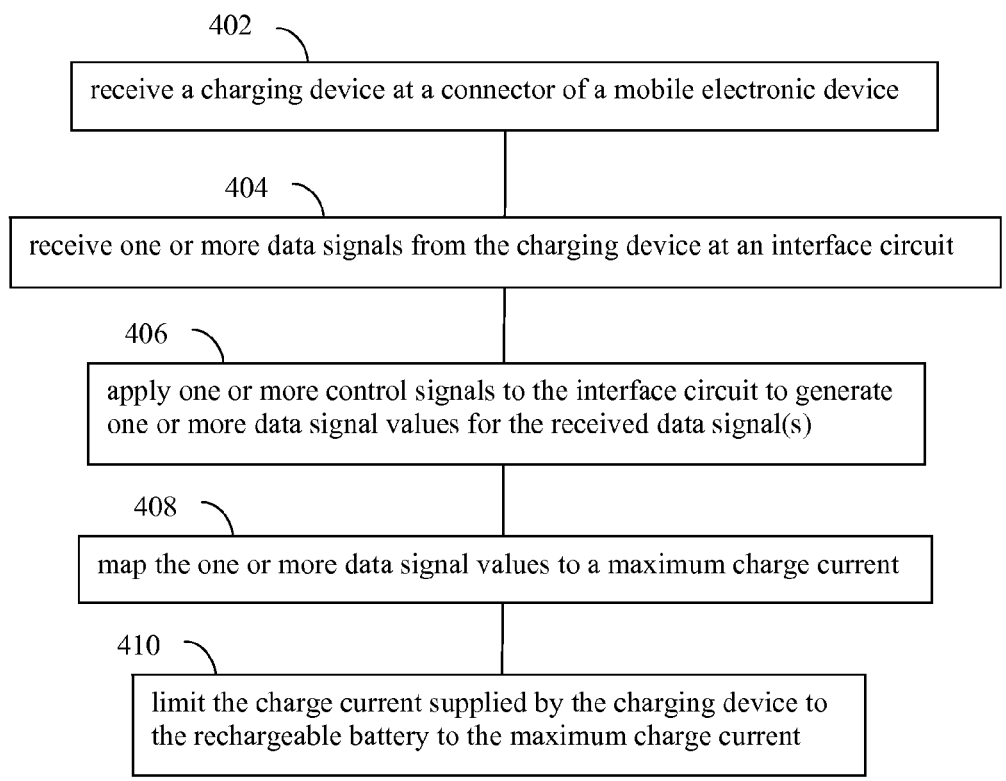
FIG. 4 shows a flowchart providing an example process for selecting a charge current to be sunk by a mobile electronic device, according to an example embodiment.

In embodiments, selection of a charge current may be performed in various ways. For instance, FIG. 4 shows a flowchart 400 providing an example process for selecting a charge current to be sunk by a mobile electronic device from a charging device, according to an example embodiment. For instance, in an embodiment, flowchart 400 may be performed by mobile electronic device 302 in FIG. 3. Other structural and operational embodiments will be apparent to persons skilled in the relevant art(s) based on the discussion regarding flowchart 400. Flowchart 400 is described as follows.

Flowchart 400 begins with step 402. In step 402, a charging device is received at a connector of a mobile electronic device. For example, as shown in FIG. 3, charging device 204 may be received at connector 206 of mobile electronic device 302. Charging device 204 may be directly plugged into connector 206 (e.g., by connecting connector 208 of charging device 204 with connector 206), or connector 208 of charging device 204 may be connected with connector 206 of mobile electronic device 302 by cable 214.

In step 404, one or more data signals is/are received from the charging device at an interface circuit. For example, as shown in FIG. 3, first and second data signal lines 220 and 222 are received at interface circuit 304. Note that steps 402 and 404 may occur at the same time (e.g., signals on first and second data signal lines 220 and 222 may be received due to connecting charging device 204 and mobile electronic device 302 together).

In step 406, one or more control signals is/are applied to the interface circuit to generate one or more data signal values for the received data signal(s). For example, as shown in FIG. 3, charge current selector 306 generates control signal(s) 312. Control signal(s) 312 are received at interface circuit 304. Charge current selector 306 may provide a sequence of one or more control signal values on control signal(s) 312. For instance, control signal(s) 312 may provide a predetermined sequence of high (e.g., "1" data values) and/or low (e.g., "0" data values) signal values to interface circuit 304. Interface circuit 304 is configured to cause first and second data signal lines 220 and 222 to be pulled up or pulled down according to the control sequence of control signal(s) 312. As a result, first and second data signal lines 220 and 222 will have data signal values based on the pull up/pull down sequence, and based on the charging device type of charging device 204 that is connected with mobile electronic device 302.

In step 408, the one or more data signal values is/are mapped to a maximum charge current. For example, as shown in FIG. 3, charge current selector 306 receives the data signal values on first and second data signal lines 220 and 222 generated by applying control signal(s) 312 to interface circuit 304. Charge current selector 306 maps the data signal values to a selected charging device type for charging device 204, and generates charge current selection signal 314, which corresponds to a maximum charge for the selected charging device type.

In step 410, the charge current supplied by the charging device to the rechargeable battery is limited to the maximum charge current. For example, as shown in FIG. 3, current limiter 310 limits the charge current provided over power signal line 116 to rechargeable battery 110 to the maximum charge current indicated by charge current selection signal 314.

Embodiments provide various advantages. For example, by selecting an appropriate sink current to be supplied by a charging device, embodiments enable greater power-efficiency, because as much current as the charger/power supply can provide is sunk. Furthermore, embodiments suitable for USB interfaces are "USB friendly," as they do not harm a low power USB host that cannot provide more than a predetermined amount of current (e.g., 100 mA). Still further, embodiments can be implemented with relatively little complexity. For instance, embodiments can be implemented on simple GPIO signals.

Example embodiments for interface circuit 304 are provided in the next subsection, followed by a subsection providing example embodiments for charge current selector 306, and a subsection providing example embodiments for post-charge current detection.

A. Example Interface Circuit Embodiments

Figure 5:
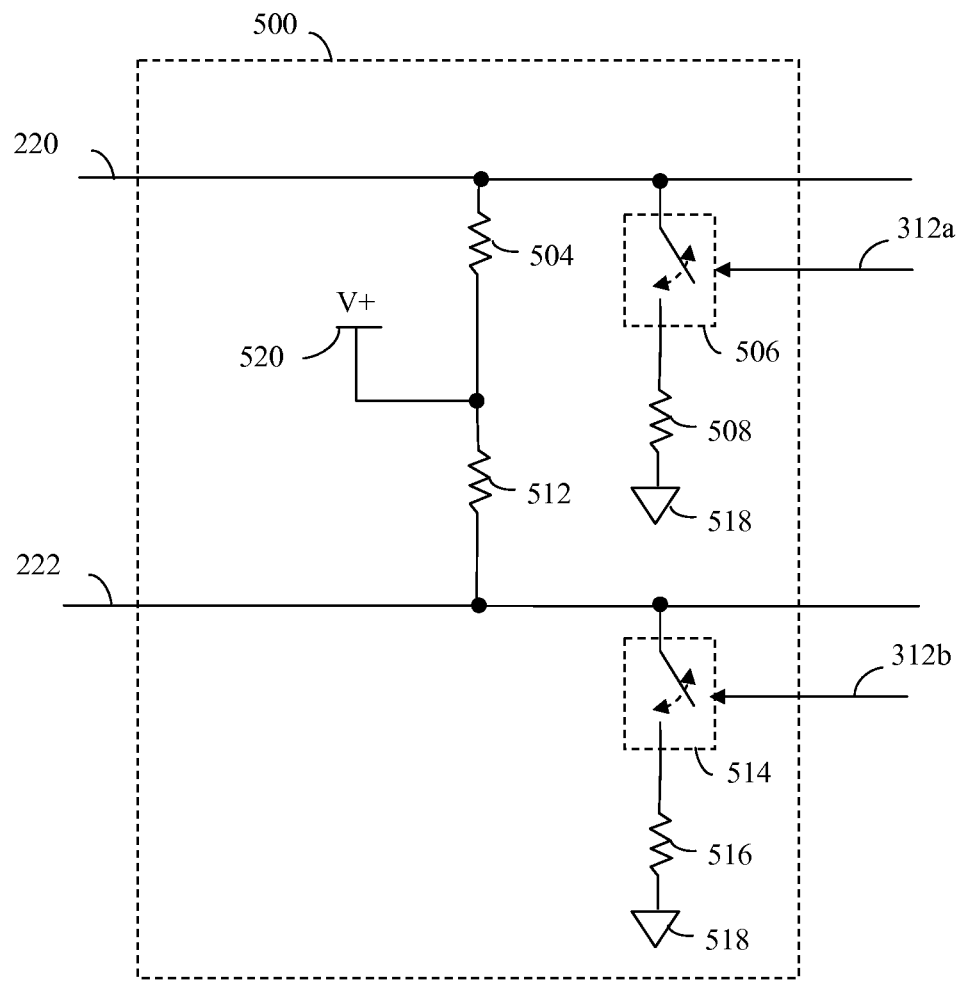
FIG. 5 shows an interface circuit, according to an example embodiment.

Interface circuit 304 may be configured in various ways to perform its functions, and may include any combination of components, such as resistors, capacitors, inductors, switches, etc. For instance, FIG. 5 shows an interface circuit 500, according to an example embodiment. Interface circuit 500 of FIG. 5 is an example of interface circuit 304 of FIG. 3. As shown in FIG. 5, interface circuit 500 includes a first resistor 504, a first switch 506, a second resistor 508, a third resistor 512, a second switch 514, and a fourth resistor 516. Interface circuit 500 is described as follows.

In FIG. 5, first data signal line 220 is coupled between charging device 204 (not shown in FIG. 5) and charge current selector 306 (not shown in FIG. 5). Furthermore, second data signal line 222 is coupled between charging device 204 (not shown in FIG. 5), and charge current selector 306 (not shown in FIG. 5).

First resistor 504 is coupled between first data signal line 220 and a power signal 520 (e.g., power signal line 116 of FIG. 3). First switch 506 has a first port coupled to first data signal line 220, a second port, and a third port that receives a first control signal 312a from charge current selector 306. Second resistor 508 is coupled between the second port of first switch 506 and a ground signal 518 (e.g., ground signal line 118 of FIG. 3).

Third resistor 512 is coupled between second data signal line 222 and power signal 520. Second switch 514 has a first port coupled to second data signal line 222, a second port, and a third port that receives a second control signal 312b from charge current selector 306. Fourth resistor 516 is coupled between the second port of second switch 514 and ground signal 518.

In the embodiment of FIG. 5, charge current selector 306 generates first and second control signals 312a and 312b. First and second control signals 312a and 312b are applied to interface circuit 500. First control signal 312a is capable of causing first data signal line 220 to be pulled up or pulled down, and second control signal 312b is capable of causing second data signal line 222 to be pulled up or pulled down. Note that in another embodiment, an additional switch (or alternatively to first switch 506) could be inserted in series with first resistor 504, and an additional switch (or alternatively to second switch 514) could be inserted in series with third switch 512. Control signals could be applied to these additional switches to enable first and second data signal lines 222 to be pulled up or down in an alternative manner.

For example, first resistor 504 may be considered to be a pull up resistor for first data signal line 220, and second resistor 508 may be considered to be a pull down resistor for first data signal line 220. Similarly, third resistor 512 may be considered to be a pull up resistor for second data signal line 222, and fourth resistor 516 may be considered to be a pull down resistor for second data signal line 222. In an embodiment, first and second resistors 504 and 508 may be asymmetric (may have different values), and third and fourth resistors 512 and 516 may be asymmetric. In one example embodiment, first and third resistors 504 and 512 may have values of 220 kOhms, and second and fourth resistors 508 and 516 may have values of 60 kOhms These resistance values are provided for purposes of illustration, and are not intended to be limiting. Resistors 504, 508, 512, and 516 may have alternative values in other embodiments. Note that in order to not be detected by a USB interface, the pull up effect may be configured to be weaker than the pull down effect.

Switches 506 and 514 may be any type of switches. For instance, switches 506 and 514 may each include one or more transistors. The transistors may be included in transistor circuits configured to enable switching.

First and second control signals 312a and 312b may cause first and second data signal lines 220 and 222 to be pulled up or pulled down, as follows. If charge current selector 306 generates first control signal 312a to have a high value, first switch 506 is closed and becomes conducting between its first and second ports. In such case, in the absence of any effect on first data signal line 220 by charging device 204, a value of first data signal line 220 may be calculated as:

voltage signal 520×value of resistor 508/(value of resistor 508+value of resistor 504)

As such, first data signal line 220 is pulled down. For instance, using the above example resistor values, and example values of 5 Volts for voltage signal 520 and 0 Volts for ground signal 518, the value of first data signal line 220 may be calculated to be 5 Volts×60 kOhms/(60 kOhms+220 kOhms)=1.07 V, which is a low data signal value. As such, first data signal line 220 is pulled down when first control signal 312a is a high value.

Similarly, if charge current selector 306 generates first control signal 312a to have a low value, first switch 506 is opened and becomes non-conducting between its first and second ports. In such case, in the absence of any data signal value provided on first data signal line 220 by charging device 204, a value of first data signal line 220 is pulled up to the value of voltage signal 520 through first resistor 504 (e.g., 5 Volts). As such, first data signal line 220 is pulled up when first control signal 312a is a low value. In a similar fashion, second control signal 312b may be pulled down or pulled up by high or low values for second control signal 312a generated by charge current selector 306, respectively.

B. Example Charge Current Selector Embodiments

Charge current selector 306 of FIG. 3 may be configured in various ways to perform its functions. For instance, in some embodiments, charge current selector 306 may refer to a data value-to-charge current map to determine a maximum charge current to be sunk by mobile electronic device 302 based on data signal values on data signal lines 220 and 222. In another embodiment, charge current selector 306 may perform an algorithm to determine a maximum charge current to be sunk by mobile electronic device 302 based on data signal values on data signal lines 220 and 222. In further embodiments, charge current selector 306 may determine a maximum charge current in other ways.

Figures 6, 7:
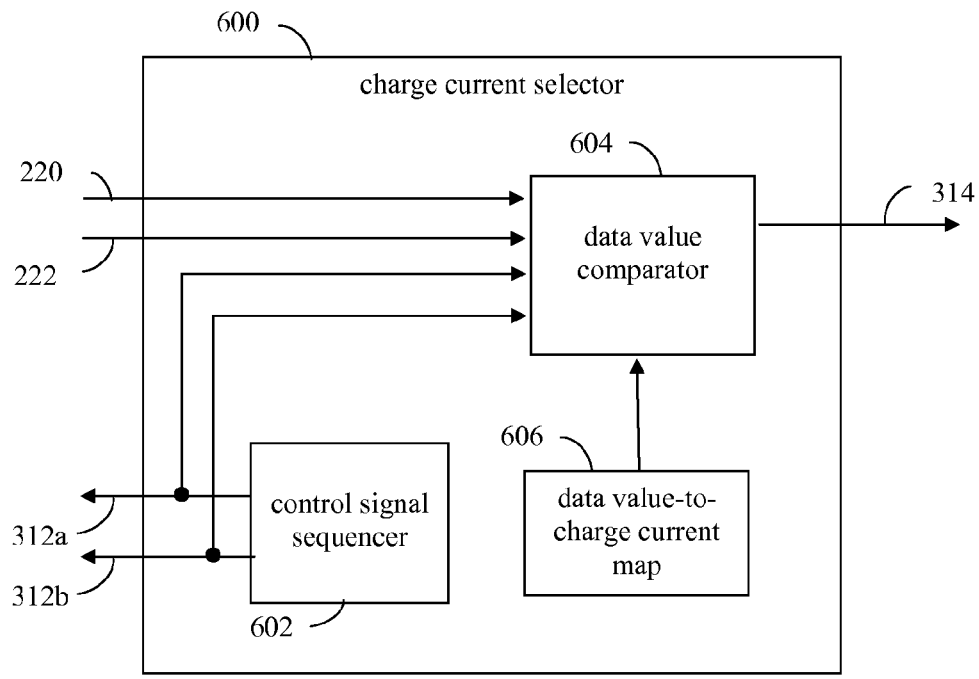
FIG. 6 shows a block diagram of a charge current selector, according to an example embodiment.
FIG. 7 shows a table that indicates data signal values for various types of charging devices based on various control signal values, according to an example embodiment.

For instance, FIG. 6 shows a block diagram of a charge current selector 600, according to an example embodiment. Charge current selector 600 of FIG. 6 is an example of charge current selector 306 of FIG. 3. As shown in FIG. 6, charge current selector 600 includes a control signal sequencer 602, a data value comparator 604, and a data value-to-charge current map 606. Control signal sequencer 602 is configured to generate first and second control signals 312a and 312b (corresponding to the example of interface circuit 500 in FIG. 5). In further embodiments, control signal sequencer 602 may generate additional numbers of control signals 312, as desired for a particular application. As shown in FIG. 6, data value comparator 604 receives first data signal line 220, second data signal line 222, first control signal 312a, second control signal 312b, and map 606. Data value comparator 604 is configured to map values of first data signal line 220, second data signal line 222, first control signal 312a, and second control signal 312b to charge current values based on map 606, to select a maximum charge current to be supplied by charging device 204 to rechargeable battery 110. As shown in FIG. 6, data value comparator 604 generates charge current selection signal 314, which is received by current limiter 310 (FIG. 3), and causes current limiter 310 to limit the charge current supplied to rechargeable battery 110 to the selected maximum charge current.

A sequence of values for control signals 312 generated by control signal sequencer 602 and the contents of map 606 may be configured according to the particular application, and to the particular types and varieties of charging devices 204 that may be coupled to mobile electronic device 302 to charge rechargeable battery 110. In embodiments, a type of charging device 204 coupled to mobile electronic device 302 may be determined based on the values of first and second data signal lines 220 and 222, which are the D+ and D− lines when connector 206 is a USB connector, as they react to values of first and second control signals 312a and 312b.

For example, a first type of charging device 204 is a charging device having a UoU interface that is capable of being connected with a USB connector of mobile electronic device 302. Such a charging device having a UoU interface has the D+ line pulled-up and D− line pulled-down internally (e.g., at first and second data signal lines 220 and 222 in FIG. 5). A second type of charging device 204 is a charging device having a PS2 interface that is plugged into a USB connector of mobile electronic device 302 by an adapter. Such a charger with a PS2 interface has the D+ and D− lines pulled up internally. A third type of charging device 204 includes a low power USB host, a high power USB host, or a charging host port charger that have the D+ and D− lines pulled down internally. Such devices are configured such that if either of the D+ or the D− line voltage level increase, they detect that another device is plugged into them. A fourth type of charging device 204 is an unknown charger. An unknown charger typically has the D+/D− lines floating internally. A fifth type of charging device 204 is a USB dedicated charger that has the D+ and D− lines connected together internally (e.g., shorted or connected together through a resistor). A commercially available example of a USB dedicated charger is a charger configured according to the YD/T-1591 charger specification. Further types of charging devices 204 having different D+ and D− line configurations are also applicable to embodiments of the present invention.

When coupled with mobile electronic device 302 of FIG. 3, each type of charging device has a corresponding signature based on the possible values for first and second control signals 312a and 312b applied to interface circuit 304. For instance, table 700 shown in FIG. 7 indicates values of first and second data signal lines 220 and 222 for the four different combinations of values of first and second control signals 312a and 312b, according to an example embodiment. As shown in table 700, the five charging device types mentioned above are listed in the left most column 702. The next four columns 704, 706, 708, and 710 of table 700 list values of first and second data signals 220 and 222 for the four combinations of high and low values for first and second control signals 312a and 312b. In column 704, first and second control signals 312a and 312b are high, such that the D+ and D− lines of first and second data signal lines 220 and 222 are pulled down. In column 706, first control signal 312a is high and second control signal 312b is low, such that the D+ and D− lines of first and second data signal lines 220 and 222 are pulled down and up, respectively. In column 708, first control signal 312a is low and second control signal 312b is high, such that the D+ and D− lines of first and second data signal lines 220 and 222 are pulled up and down, respectively. In column 710, first and second control signals 312a and 312b are low, such that the D+ and D− lines of first and second data signal lines 220 and 222 are pulled up. Column 712 of table 712 shows hexadecimal signature values that are concatenations of the values of first and second data signals 312a and 312b shown in columns 704-710 for all four combinations of values of first and second control signals 312a and 312b.

For example, for the first charger type (the charging device with UoU interface), first and second data signal lines 220 and 222 respectively have values of 1 and 0 in column 704, values of 1 and 1 in column 706, values of 1 and 0 in column 708, and values of 1 and 1 in column 710. As such, the first charger type has a hexadecimal signature in column 712 of BB Hex. For the second charger type (the charging device with PS2 interface), for all combinations of first and second control signals 312a and 312b in columns 704-712, first and second data signal lines 220 and 222 are both high or 1 data values. As such, the second charger type has a hexadecimal signature in column 712 of FF Hex. In a similar fashion, the third-fifth charger types have values for first and second data signal lines 220 and 222 in columns 704-710 corresponding to the four combinations of first and second control signals 312a and 312b, and hexadecimal signatures in column 712. The hexadecimal signature for the third charger type is 00, the hexadecimal signature for the fourth charger type is 1 B, and the hexadecimal signature for the fifth charger type is 03.

Because each of the charging device types have different signatures on first and second data signal lines 220 and 222 based on the different combinations of first and second control signals 312a and 312b, data value comparator 604 may use these signatures, or portions thereof, to distinguish the charging device types, and therefore to determine the type of charging device 204 coupled to mobile electronic device 302. For example, combinations of values for first and second control signals 312a and 312b and associated values of first and second data signal lines 220 and 222 that are unique to each charger type may be selected to be used to distinguish each charger type from other charger types.

For example, in one embodiment, map 606 may include a portion or all of the information indicated in Table 2, shown as follows:

TABLE 2

| first control signal 312a, second control signal 312b | first data signal line 220, second data signal line 222 | selected charging device type | selected maximum charge current |
|---|---|---|---|
| 1, 1 | 1, 0 | first charging device type | 100 mA |
| 1, 1 | 1, 1 or 0, 1 | second charging device type | 100 mA |
| 0, 0 | 0, 0 or 0, 1 or 1, 0 | third charging device type | 100 mA |
| 1, 0 | 0, 1 | fourth charging | 300 mA |

TABLE 2-continued

| first control signal 312a, second control signal 312b | first data signal line 220, second data signal line 222 | selected charging device type | selected maximum charge current |
|---|---|---|---|
| 1, 0 | 0, 0 or 1, 0 or 1, 1 | device type fifth charging device type | 400 mA |

In an embodiment, control signal sequencer 602 may sequence first and second control signals 312a and 312b in the order of the values indicated in the first column of Table 2. For each combination of control signal values, data value comparator 604 may read the values of first and second data signal lines 220 and 222, and may compare the values of first and second data signal lines 220 and 222 with the corresponding values shown in the second column of Table 2. If the values of first and second data signal lines 220 and 222 match with the values shown in the second column of Table 2 in a particular row, the selected charger type is indicated in the third column of Table 2 in that row, and the selected maximum charge current is indicated in the fourth column of Table 2 in that row.

For instance, in the example of Table 2, control signal sequencer 602 may first configure first and second control signals 312a and 312b to both have high values. In such a state for first and second control signals 312a and 312b, data value comparator 604 reads the values of first and second data signal lines 220 and 222. Values of 1 and 0 for first and second data signal lines 220 and 222, respectively, correspond to the first charging device type, and a maximum charge current of 100 mA, as indicated in the first row of Table 2. Values of 0 and 1 for first and second data signal lines 220 and 222, respectively, correspond to the second charging device type, and a maximum charge current of 100 mA, as indicated in the second row of Table 2. Values of 1 and 1 for first and second data signal lines 220 and 222, respectively, also correspond to the second charging device type, and a maximum charge current of 100 mA, as indicated in the second row of Table 2. If data value comparator 604 does not find a match for first and second data signal lines 220 and 222 in Table 2, control signal sequencer 602 may modify first and second control signals 312a and 312b to both have zero values, which is the next iteration indicated in the first column of Table 2. In a similar fashion as described above, data value comparator 604 reads the values of first and second data signal lines 220 and 222 and attempts to find a match in Table 2. If a match is found in a row of Table 2, the charging device type and maximum charge current indicated in the row are selected. If a match is not found in a row of Table 2, control signal sequencer 602 sequences to the next values of first and second control signals 312a and 312b, and data value comparator 604 reads values of first and second data signal lines 220 and 222 and attempts to find a match. This process continues until a match is found, or the end of Table 2 is reached.

Note that the example of map 606 shown in Table 2 is provided for purposes of illustration, and is not intended to be limiting. Map 606 can include fewer or greater numbers of columns (e.g., the selected charging device type column may not be present), and/or may include different control signal and data signal values, different numbers and types of charging devices, and/or different maximum charge current values, depending on the particular application.

Figure 8A:
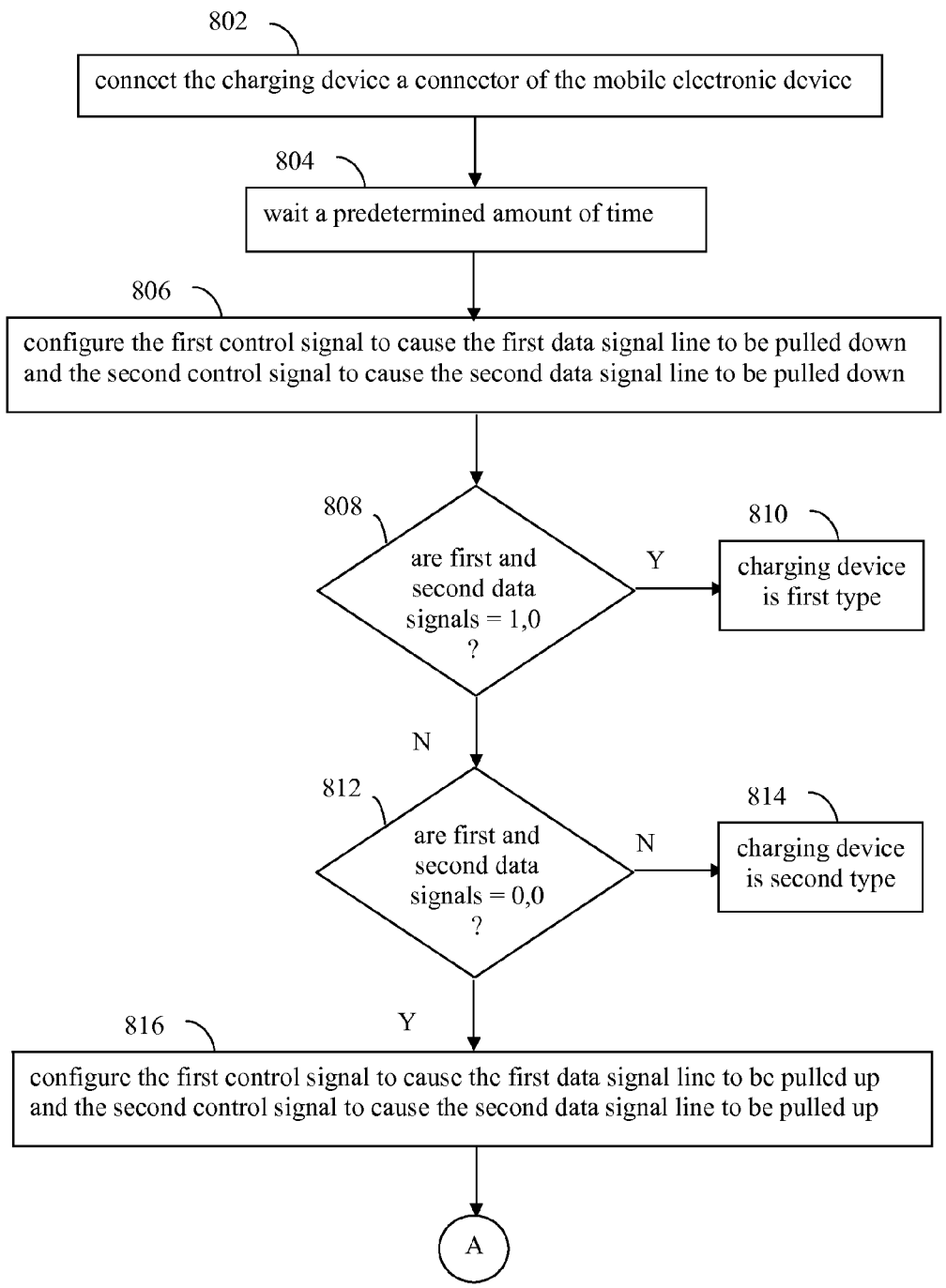
FIGS. 8A and 8B show a flowchart providing an example process for selecting a charge current to be sunk by a device, according to an example embodiment.
Figure 8B:
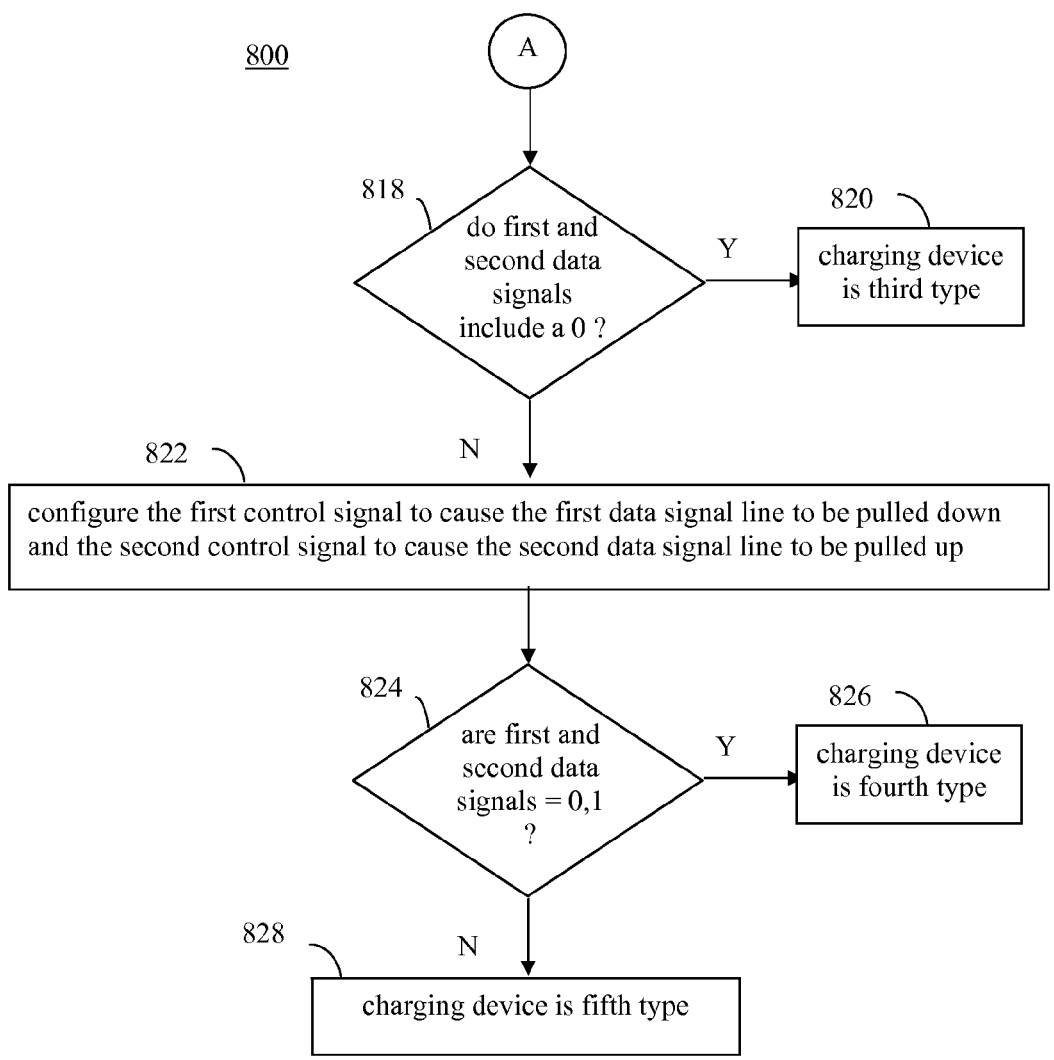

Selection of a charge current according to control signals and data signal values may be performed in further ways, including ways that do not use a data value-to-charge current map. For instance, FIGS. 8A and 8B show a flowchart 800 providing an example process for selecting a charge current to be sunk by a mobile electronic device from a charging device, according to an example embodiment. Flowchart 800 is an example of flowchart 400 of FIG. 4. In an embodiment, flowchart 800 may be performed by mobile electronic device 302 in FIG. 3. Note that an order of decisions performed by flowchart 800 takes into account corner cases so that the safest decision is always taken first. Flowchart 800 is described with respect to interface circuit 500 of FIG. 5 for illustrative purposes. Other structural and operational embodiments will be apparent to persons skilled in the relevant art(s) based on the discussion regarding flowchart 800. Flowchart 800 is described as follows.

Flowchart 800 begins with step 802 in FIG. 8A. In step 802, the charging device is connected to a connector of the mobile electronic device. For example, as shown in FIG. 3, charging device 204 may be received at connector 206 of mobile electronic device 302. Charging device 204 may be directly plugged into connector 206 (e.g., by connecting connector 208 of charging device 204 with connector 206), or connector 208 of charging device 204 may be connected with connector 206 of mobile electronic device 302 by cable 214. Operation proceeds to step 804.

In step 804, a predetermined amount of time is waited. Step 804 is optional. In an embodiment, after connecting charging device 204 and mobile electronic device 302 together, a predetermined amount of time (e.g., 0.5 seconds or other length of time) may be waited for to allow first and second data signal lines 220 and 222 to settle or debounce, and/or to allow another event to occur. For instance, USB plugs and receptacles are typically configured such that when a plug is inserted into a receptacle, the power and ground pins make contact before the D+ and D− data pins make contact. As such, in order to avoid a misinterpretation of the values of first and second data signal lines 220 and 222, a delay of 0.5 second may be waited before proceeding further. Operation proceeds to step 806.

In step 806, the first control signal is configured to cause the first data signal line to be pulled down and the second control signal is configured to cause the second data signal line to be pulled down. For example, in an embodiment, control signal sequencer 602 of FIG. 6 may generate first control signal 312a to have a high value and second control signal 312b to have a high value. As shown in FIG. 5, first switch 506 is closed when first control signal 312a is high, causing first switch 506 to be conductive and first data signal 220 to be pulled down. Similarly, second switch 514 is closed when second control signal 312b is high, causing second switch 514 to be conductive and second data signal line 222 to be pulled down. Operation proceeds to step 808. Note that in an embodiment, first and second data signal lines 220 and 222 may be pulled down in a default initial state (e.g., prior to step 802).

In step 808, whether the data values of the first and second data signals are equal to (1, 0) is determined When first and second data signal lines 220 and 222 both have pull down circuits applied, if the data values of the first and second data signals carried on first and second data signal lines 220 and 222 are equal to (1, 0), operation proceeds to step 810. If the data values of the first and second data signals carried on first and second data signal lines 220 and 222 are not equal to (1, 0), operation proceeds to step 812.

In step 810, the charging device is determined to be the first type. For example, because the values of the first and second data signals carried on first and second data signal lines 220 and 222 are 1 and 0 when first and second data signal lines 220 and 222 both have pull down circuits applied (first and second control signals 312a and 312b are both high), charging device 204 may be determined to be a first charging device type (e.g., a charging device having its D+ line pulled-up and D− line pulled-down internally, such as a charging device having a UoU interface). Referring to table 700 of FIG. 7, the first charger type is the only charger type of the five charger types that reacts this way. Operation of flowchart 800 ends.

In step 812, whether the data values of the first and second data signals are equal to (0, 0) is determined When first and second data signal lines 220 and 222 both have pull down circuits applied, if the data values of the first and second data signals carried on first and second data signal lines 220 and 222 are not equal to (0, 0), operation proceeds to step 814. If the data values of the first and second data signals carried on first and second data signal lines 220 and 222 are equal to (0, 0), operation proceeds to step 816.

In step 814, the charging device is determined to be the second type. For example, because the values of the first and second data signals carried on first and second data signal lines 220 and 222 are not 0 and 0 (already determined not to be 1 and 0 in step 808) when first and second data signal lines 220 and 222 both have pull down circuits applied (first and second control signals 312a and 312b are both high), charging device 204 may be determined to be a second charging device type. For example, charging device 204 may have a PS2 interface that couples with a USB connector of mobile electronic device 302 using an adaptor. A charging device that has a PS2 interface has the D+ and D− lines pulled up internally, and thus first and second data signal lines 220 and 222 are read as 1 and 1, respectively, which is not 0 and 0. Because the D+ and D− lines are pulled up by the PS2 interface to a high voltage, it may desirable to keep the D+ and D− lines in a pull down state in the mobile electronic device, to preserve a reasonable signal voltage. Operation of flowchart 800 ends.

In step 816, the first control signal is configured to cause the first data signal line to be pulled up and the second control signal is configured to cause the second data signal line to be pulled up. For example, in an embodiment, control signal sequencer 602 of FIG. 6 may generate first control signal 312a to have a low value and second control signal 312b to have a low value. As shown in FIG. 5, first switch 506 is open when first control signal 312a is low, causing first switch 506 to be non-conductive and first data signal line 220 to be pulled up. Similarly, second switch 514 is open when second control signal 312b is low, causing second switch 514 to be non-conductive and second data signal line 222 to be pulled up. Operation proceeds to step 818 in FIG. 8B.

In step 818, whether either or both of the data values of the first and second data signals is/are equal to a zero is determined When first and second data signal lines 220 and 222 have pull up circuits applied, if either or both of the data values of the first and second data signals carried on first and second data signal lines 220 and 222 is/are equal to 0, operation proceeds to step 820. If neither of the data values of the first and second data signals carried on first and second data signal lines 220 and 222 is equal to 0, operation proceeds to step 822.

In step 820, the charging device is determined to be the third type. For example, because either or both of the values of the first and second data signals carried on first and second data signal lines 220 and 222 are 0 when first and second data signal lines 220 and 222 have pull up circuits applied (first and second control signals 312a and 312b are both low), charging device 204 may be determined to be a third charging device type (e.g., a charging device having its D+ and D− lines pulled down.). For example, charging device 204 may be a low power USB host, a high power USB host, or a charging host port charger. Operation of flowchart 800 ends.

In step 822, the first control signal is configured to cause the first data signal line to be pulled down and the second control signal is configured to cause the second data signal line to be pulled up. For example, in an embodiment, control signal sequencer 602 of FIG. 6 may generate first control signal 312a to have a high value and second control signal 312b to have a low value. As shown in FIG. 5, first switch 506 is closed when first control signal 312a is high, causing first switch 506 to be conductive and first data signal line 220 to be pulled down. Similarly, second switch 514 is opened when second control signal 312b is low, causing second switch 514 to be non-conductive and second data signal line 222 to be pulled up. Operation proceeds to step 824.

In step 824, whether the data values of the first and second data signals are equal to (0, 1) is determined When first data signal line 220 has a pull down circuit applied, and second data signal line 222 has a pull up circuit applied, if the data values of the first and second data signals carried on first and second data signal lines 220 and 222 are equal to (0, 1), operation proceeds to step 826. If the data values of the first and second data signals carried on first and second data signal lines 220 and 222 are not equal to (0, 1), operation proceeds to step 828.

In step 826, the charging device is determined to be the fourth type. For example, because first data signal line 220 has a value of 0 and second data signal line 222 has a value of 1 when first data signal line 220 has a pull down circuit applied, and second data signal line 222 has pull up circuit applied (first control signal 312a is low, and second control signal 312b is high), charging device 204 may be determined to be a fourth charging device type (e.g., a charging device having its D+ and D− lines floating.). For example, charging device 204 may be an unknown charger. Operation of flowchart 800 ends.

In step 828, the charging device is determined to be the fifth type. For example, because first and second data signal lines 220 and 222 do not have values of 0 and 1 when first data signal line 220 has a pull down circuit applied, and second data signal line 222 has pull up circuit applied (first control signal 312a is low, and second control signal 312b is high), charging device 204 may be determined to be a fifth charging device type (e.g., a charging device that has its D+ and D− lines connected together). For example, charging device 204 may be a USB dedicated charger such as a charger configured according to the YD/T-1591 charger specification or other similarly configured charger. Operation of flowchart 800 ends.

In flowchart 800, after the charging device type is determined (e.g., in step 810, 814, 820, 826, or 828), a predetermined maximum charge current for the charging device type may be selected. For example, the maximum charge current values shown in Table 2 may be the predetermined maximum charge currents for the five charging device types, or the predetermined maximum charge currents may have other values. Charge current selector 306 may generate charge current selection signal 314 to cause current limiter 310 to limit the charge current to the selected predetermined maximum charge current.

Note that charge current selector 306, charge current selector 600, control signal sequencer 602, and data value comparator 604 may be implemented in hardware, software, firmware, or any combination thereof. For example, charge current selector 306, charge current selector 600, control signal sequencer 602, and/or data value comparator 604 may be implemented as computer program modules or code configured to be executed in one or more processors. Alternatively, charge current selector 306, charge current selector 600, control signal sequencer 602, and/or data value comparator 604 may be implemented as hardware logic/electrical circuitry

C. Example Post-Charge Current Selection Embodiments

Figure 9:
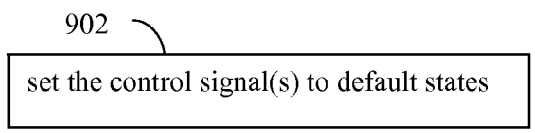
FIG. 9 shows a process for setting data signal lines to default states, according to an example embodiment.

In an embodiment, after a sink current for a mobile electronic device is selected, the pull up/pull down circuits of interface circuit 304 can be set to default states. For instance, in an embodiment, a step 902 shown in FIG. 9 may be performed. For instance, step 902 may be performed after performing flowchart 400 of FIG. 4, or after performing flowchart 800 of FIGS. 8A and 8B. In step 902, the control signal(s) is/are set to default states. For example, referring to FIG. 3, charge current selector 306 may generate control signal(s) 312 to cause data signal lines 220 and 222 to be pulled up or pulled down, as desired. For instance, it may be desired to place data signal lines 220 and 222 in a pulled up or pulled down state so that normal communications may be performed by mobile electronic device 302 using data signal lines 220 and 222, to save power consumption, and/or for other purpose. After step 902, charging device 204 may be disconnected from mobile electronic device 302.

For example, referring to FIGS. 5 and 6, in an embodiment, after selecting a sink current, control signal sequencer 602 may set first and second control signals 312a and 312b to high levels, so that switches 506 and 514 are closed, and first and second data signal lines 220 and 222 are pulled down. In another embodiment, control signal sequencer 602 may set first and second control signals 312a and 312b to low levels, so that switches 506 and 514 are opened, and first and second data signal lines 220 and 222 are pulled up.

Note that flowchart 400, flowchart 800, and step 902 (including any one or more steps of flowcharts 400 and 800) may be implemented in hardware, software, firmware, or any combination thereof. For example, flowchart 400, flowchart 800, and/or step 902 may be implemented as computer program modules or code stored on a computer readable medium (e.g., a tangible storage device such as a memory device, a hard drive, an optical disc, a removable storage device, etc.) and configured to be executed in one or more processors. Alternatively, flowchart 400, flowchart 800, and/or step 902 may be implemented as hardware logic/electrical circuitry.

V. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents

What is claimed is:

1. A mobile electronic device that includes a rechargeable battery, the mobile electronic device comprising:
a connector configured to receive a connection with a charging device, the charging device being configured to supply a charge current to a rechargeable battery;
an interface circuit coupled to one or more data signal lines coupled between the charging device and the mobile electronic device through the connector; and
a charge current selector configured to apply one or more control signals to the interface circuit to generate one or more data signal values on the one or more data signal lines, and to map the one or more data signal values to a maximum charge current for the rechargeable battery.

2. The mobile electronic device of claim 1, further comprising:
a current limiter configured to limit the charge current supplied by the charging device to the rechargeable battery to the selected maximum charge current.

3. The mobile electronic device of claim 1, wherein the one or more data signal lines carry a first data signal on a first data signal line and a second data signal on a second data signal line that are received by the charge current selector from the charging device.

4. The mobile electronic device of claim 3, wherein the interface circuit comprises:
a first resistor coupled between the first data signal line and a power signal;
a first switch having a first port coupled to the first data signal line, a second port, and a third port that receives a first control signal from the charge current selector;
a second resistor coupled between the second port of the first switch and a ground signal;
a third resistor coupled between the second data signal line and the power signal;
a second switch having a first port coupled to the second data signal line, a second port, and a third port that receives a second control signal from the charge current selector; and
a fourth resistor coupled between the second port of the second switch and the ground signal.

5. The mobile electronic device of claim 3, wherein the charge current selector comprises:
a control signal sequencer that configures a first control signal to cause the first data signal line to be pulled down, and configures a second control signal to cause the second data signal line to be pulled down; and
a data value comparator that receives the first control signal, the second control signal, the first data signal, and the second data signal;
wherein the data value comparator is configured to determine the maximum charge current to be a first current if the first data signal has a high data value and the second data signal has a low data value; and
wherein the data value comparator is configured to determine the maximum charge current to be a second current if the first data signal has a high data value and the second data signal has a high data value.

6. The mobile electronic device of claim 5, wherein the control signal sequencer is configured to modify the first control signal to cause the first data signal line to be pulled up, and to modify the second control signal to cause the second data signal line to be pulled up; and
wherein the data value comparator is configured to determine the maximum charge current to be a third current if at least one of the first data signal or second data signal has a low data value.

7. The mobile electronic device of claim 6, wherein the control signal sequencer is configured to modify the first control signal to cause the first data signal line to be pulled down, the second control signal being configured to cause the second data signal line to be pulled up;

wherein the data value comparator is configured to determine the maximum charge current to be a fourth current if the first data signal has a low data value and the second data signal has a high data value; and wherein the data value comparator is configured to determine the maximum charge current to be a fifth current if at least one of the first data signal has a high data value or the second data signal has a low data value.

8. The mobile electronic device of claim 7, wherein the control signal sequencer is configured to set the first and second control signals to default states for normal communications over the one or more data signal line after the charging device type is determined.

9. The mobile electronic device of claim 1, wherein the connector is a universal serial bus (USB) connector.

10. A method at a mobile electronic device, comprising:
receiving a charging device at a connector, the charging device being configured to supply a charge current to a rechargeable battery of the mobile electronic device;
receiving one or more data signals from the charging device at an interface circuit of the mobile electronic device, the interface circuit being coupled to one or more data signal lines carrying the one or more data signals;
applying one or more control signals to the interface circuit to generate one or more data signal values for the received one or more data signals; and
mapping the one or more data signal values to a maximum charge current for the rechargeable battery.

11. The method of claim 10, wherein said receiving one or more data signals from the charging device at an interface circuit of the mobile electronic device comprises:
receiving a first data signal on a first data signal line and a second data signal on a second data signal line.

12. The method of claim 11, wherein said applying comprises:
generating a first control signal and a second control signal that are applied to the interface circuit, the first control signal being capable of causing the first data signal line to be pulled up or pulled down, and the second control signal being capable of causing the second data signal line to be pulled up or pulled down.

13. The method of claim 11, wherein said applying further comprises:
configuring a first control signal to cause the first data signal line to be pulled down; and
configuring a second control signal to cause the second data signal line to be pulled down.

14. The method of claim 13, wherein said mapping comprises:
determining that the maximum charge current is a first current if the first data signal has a high data value and the second data signal has a low data value; and
determining that the maximum charge current is a second current if the first data signal has a high data value and the second data signal has a high data value.

15. The method of claim 14, wherein said applying further comprises:
modifying the first control signal to cause the first data signal line to be pulled up; and
modifying the second control signal to cause the second data signal line to be pulled up.

16. The method of claim 15, wherein said mapping comprises:
determining that the maximum charge current is a third current if at least one of the first data signal or second data signal has a low data value.

17. The method of claim 14, wherein said applying further comprises:
modifying the first control signal to cause the first data signal line to be pulled down, the second control signal being configured to cause the second data signal line to be pulled up.

18. The method of claim 17, wherein said mapping comprises:
determining that the maximum charge current is a fourth current if the first data signal has a low data value and the second data signal has a high data value; and
determining that the maximum charge current is a fifth current if at least one of the first data signal has a high data value or the second data signal has a low data value.

19. The method of claim 18, further comprising:
limiting the charge current supplied by the charging device to the rechargeable battery to the selected maximum charge current.

20. The method of claim 18, further comprising:
setting the first and second control signals to default states for normal communications over the one or more data signals lines.

21. A charge current selector in a mobile electronic device, comprising:
a control signal sequencer configured to apply one or more control signals to an interface circuit coupled to one or more data signals lines, the one or more data signal lines, a power signal line, and a ground signal line being coupled between the mobile electronic device and a charging device through a connector of the mobile electronic device, the one or more control signals configured to cause the one or more data signals lines to be pulled up or pulled down by the interface circuit to cause one or more data signal values for one or more data signals carried on the one or more data signal lines; and
a data value comparator configured to map the one or more data signal values to a maximum charge current for a rechargeable battery.

22. The charge current selector of claim 21, wherein the one or more data signals include a first data signal carried on a first data signal line and a second data signal carried on a second data signal line, wherein the control signal sequencer configures a first control signal to cause the first data signal line to be pulled down, and configures a second control signal to cause the second data signal line to be pulled down;
wherein the data value comparator is configured to determine that the maximum charge current is a first current if the first data signal has a high data value and the second data signal has a low data value; and
wherein the data value comparator is configured to determine that the maximum charge current is a second current if the first data signal has a high data value and the second data signal has a high data value.

23. The charge current selector of claim 22, wherein the control signal sequencer is configured to modify the first control signal to cause the first data signal line to be pulled up, and to modify the second control signal to cause the second data signal line to be pulled up; and
wherein the data value comparator is configured to determine that the maximum charge current is a third current if at least one of the first data signal or second data signal has a low data value.

24. The charge current selector of claim 23, wherein the control signal sequencer is configured to modify the first control signal to cause the first data signal line to be pulled down, the second control signal being configured to cause the second data signal line to be pulled up;

wherein the data value comparator is configured to determine that the maximum charge current is a fourth current if the first data signal has a low data value and the second data signal has a high data value; and wherein the data value comparator is configured to determine that the maximum charge current is a fifth current if at least one of the first data signal has a high data value or the second data signal has a low data value.

* * * * *

UNITED STATES PATENT AND TRADEMARK OFFICE
CERTIFICATE OF CORRECTION

PATENT NO.        : 8,729,867 B2
APPLICATION NO.   : 12/938956
DATED             : May 20, 2014
INVENTOR(S)       : Domitille Esnard-Domerego et al.

Page 1 of 1

It is certified that error appears in the above-identified patent and that said Letters Patent is hereby corrected as shown below:

In the Claims

In column 18, line 22, in claim 20, delete "signals lines." and insert -- signal lines. --, therefor.

In column 18, line 27, in claim 21, delete "signals lines," and insert -- signal lines, --, therefor.

In column 18, line 32, in claim 21, delete "signals lines" and insert -- signal lines --, therefor.

Signed and Sealed this
Sixteenth Day of September, 2014

Michelle K. Lee
*Deputy Director of the United States Patent and Trademark Office*